W. S. JOBES.
TIRE INFLATING PUMP.
APPLICATION FILED MAR. 28, 1914.

1,115,435.

Patented Oct. 27, 1914.
2 SHEETS—SHEET 1.

Witnesses

Inventor
Willard S. Jobes,
by
Attorney.

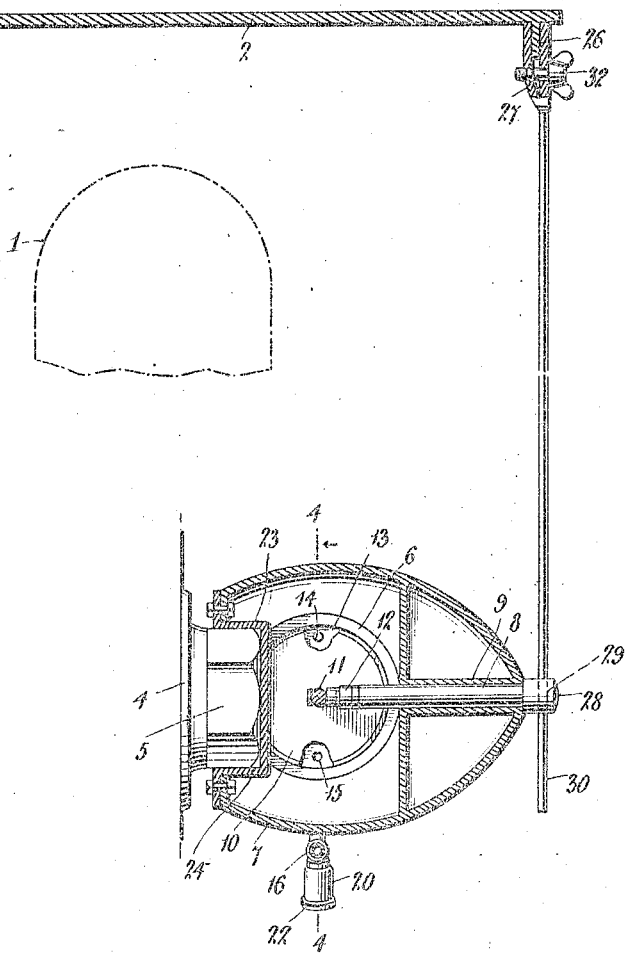
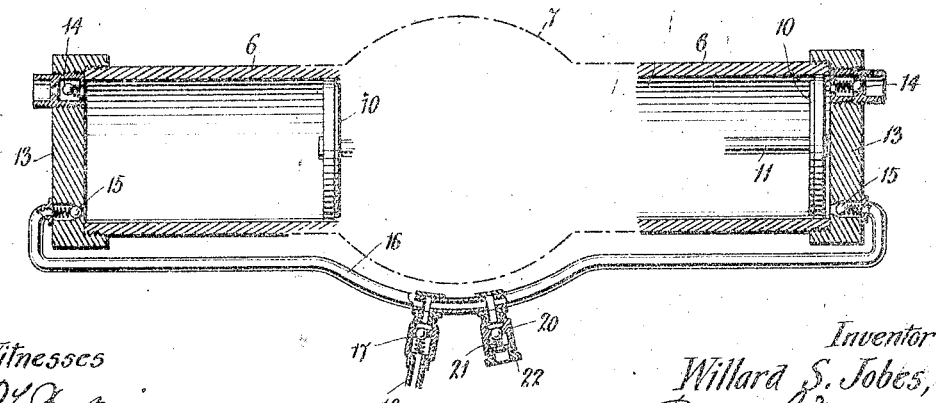

UNITED STATES PATENT OFFICE.

WILLARD S. JOBES, OF SAN ANTONIO, TEXAS, ASSIGNOR TO JOSEPH A. GRAHAM, OF SAN ANTONIO, TEXAS.

TIRE-INFLATING PUMP.

1,115,435.   Specification of Letters Patent.   Patented Oct. 27, 1914.

Application filed March 28, 1914. Serial No. 828,042.

*To all whom it may concern:*

Be it known that I, WILLARD S. JOBES, a citizen of the United States, residing at San Antonio, in the county of Bexar and State of Texas, have invented new and useful Improvements in Tire-Inflating Pumps, of which the following is a specification.

My present invention relates to improvements in air pumps or compressors and more especially to those of the type adapted for use upon automobiles or other vehicles for inflating pneumatic tires and other purposes.

The primary object of the present invention is to provide a relatively simple and inexpensive air pump which is capable of being readily applied to automobiles or vehicles of different types and which is actuated by rotation of a wheel thereof, the pump being particularly adapted to be applied to one of the hub caps of one of the wheels and connected to the tire whereby revolving of the wheel will actuate the pump to produce a supply of compressed air.

To these and other ends, the invention consists in certain improvements, and combinations and arrangements of parts, all as will be hereinafter more fully described, the novel features being pointed out particularly in the claims at the end of the specification.

Figure 1:
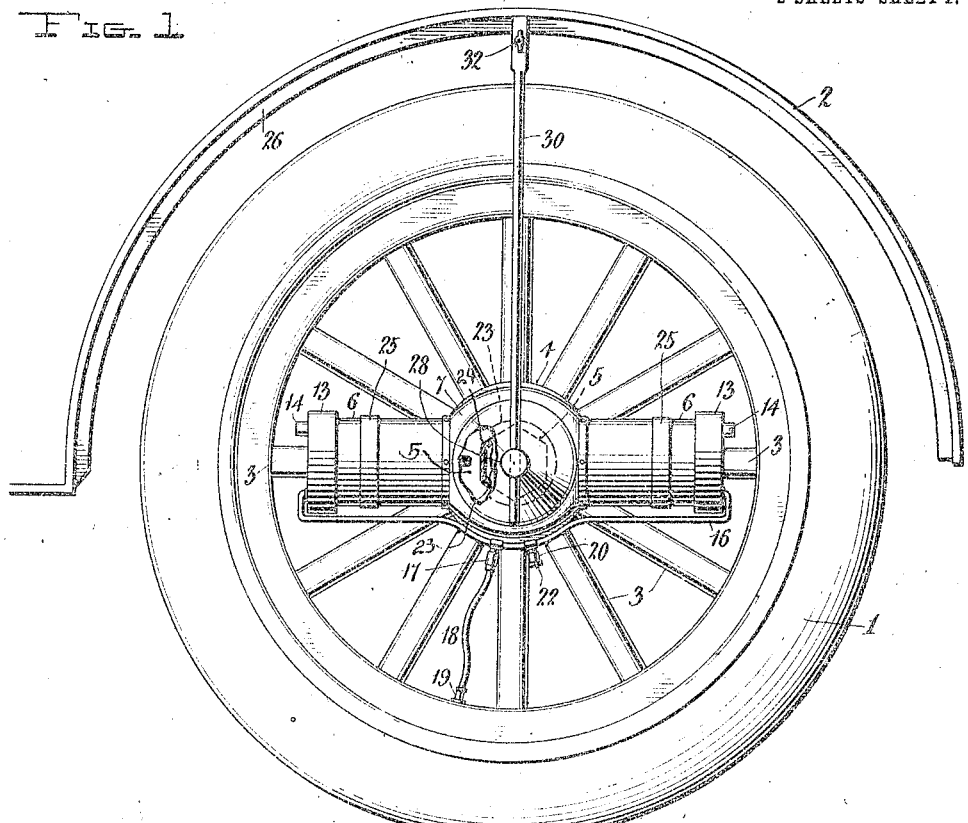
Figure 2:
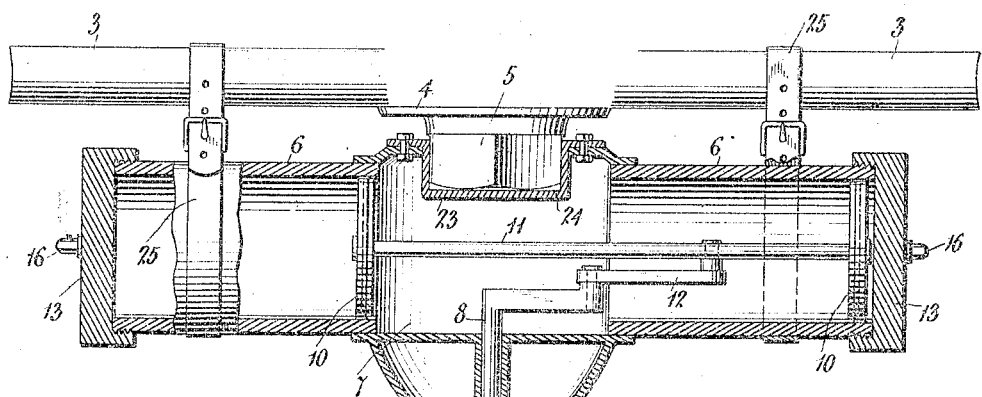

In the accompanying drawing:—Figure 1 is a side elevation of one of the wheels of an automobile equipped with an air pump or compressor constructed in accordance with the present invention; Fig. 2 represents an axial section through the pump on an enlarged scale; Fig. 3 represents a transverse section through the pump; Fig. 4 represents a section on the line 4—4 of Fig. 3.

Similar parts are designated by the same reference characters in the several views.

In the present instance 1 designates one of the wheels of an automobile or other vehicle, 2 represents a fender therefor, the fender being usually fixed to the body of the automobile and the body being supported on the axle of the wheel by springs. The wheel has spokes 3 as usual, and the hub 4 of the wheel is shown provided with the usual hub cap 5, it being common to employ hub caps in the form of a nut or other angular shape.

The pump in the construction shown consists of a casing forming a pair of axially alined cylinders 6 and an intermediate crank case 7. A crank shaft 8 is mounted in a bearing 9 in the crank case. A pair of pistons 10 are mounted to reciprocate in the respective cylinders and are connected to one another by the rod 11 and to the crank shaft by a connecting rod 12. Heads 13 are secured to the outer ends of the cylinders, and the head of each cylinder is provided with an inlet valve 14 through which a charge of air is drawn into the cylinder, and an outlet valve 15 through which the compressed air is delivered from the cylinder. The outlet valves of the cylinders are connected to a common pipe 16, and this pipe is connected to a check-valve 17, the latter being connected in turn by a hose 18, which is preferably flexible, to the inflating valve 19 of the tire. In order to prevent pumping an excess amount of air into the tire, a relief or equalizing valve is provided, the relief valve 20 being connected in the present instance to the pipe 16 and is held on its seat by a spring 21, this spring being held under compression by means which is adjustable whereby the relief valve may be set to open at any pressure desired. In the present instance a threaded or adjustable plug 22 acts upon the spring 21 to hold it under the desired degree of compression.

The pump, according to the present invention, is rotatable with the wheel. For this purpose, a clutch member in the form of a socket 23 is fixed to one side of the pump casing and has a chamber 24 shaped to fit over the hub cap 5 of the wheel, a driving connection being thereby provided between the wheel and pump. In order to retain the socket on the pump in proper engagement with the hub cap, a suitable number of straps 25 or the like are provided, the outer ends of which engage the respective cylinders, and the inner ends of the straps engage the spokes 3 of the wheel, these straps acting to force the socket member 23 toward the hub cap and to retain it in proper engagement therewith. During rotation of the wheel, the crank shaft 8 is held stationary whereby the rotation of the pump casing relatively to the crank shaft will cause reciprocation of the pump pistons. In the present instance, a collar 28 is fitted over the outer end of the crank shaft 8 and has an opening 29 extending therethrough to slidingly receive a rod 30, the latter extending perpendicularly upwardly from the crank shaft and being secured to the depending flange 26 of the fender 2 by a clamping member 27 and a screw 32. This rod holds the crank shaft from rotation while the pump casing revolves although its sliding engagement with the collar 28 permits relative vibration between the wheel and the fender due to the spring action between these parts.

In operation, revolving of the wheel to which the pump is connected causes the pump to compress air, and this may occur either during the running of the automobile or vehicle along the road or when the pump is attached to one of the rear or driving wheels of the automobile, the pump being operated by jacking or lifting such wheel from the ground and revolving it by the running of the motor.

I claim as my invention:—

1. In an air pump of the character described, the combination with a casing having cylinders and pistons operative therein, and a crank shaft for operating the pistons, of means for connecting the pump casing to revolve with the wheel of a vehicle, and means adapted to be connected to the body of a vehicle and having a sliding connection with said shaft for preventing rotation of the crank shaft.

2. The combination with an air pump having reciprocatory pistons and a shaft for operating the same, of a coupling adapted to fit upon and form a driving connection with the hub cap of a wheel to cause rotation of the pump therewith, and means for preventing rotation of the crank shaft.

3. The combination of an air pump having reciprocatory pistons and a shaft for operating them, of means for connecting the pump to revolve with the wheel of a vehicle, the shaft of the pump being co-axial with said wheel, and a rod adapted to be connected to the body of the vehicle and having a sliding connection with said shaft for preventing rotation of the pump shaft and permitting vibratory movement thereof.

4. The combination with a vehicle wheel having an angular projection turnable therewith, an air pump having reciprocatory pistons and a shaft for operating the same, of a socket secured to the pump and shaped to fit upon said angular projection and thereby form a driving connection with the wheel, and means for preventing rotation of the shaft.

5. The combination with a vehicle wheel having a hub cap of angular form thereon, a pump having pistons, and a shaft for actuating the same, an angular socket adapted to fit said angular hub cap and thereby connect one part of the pump to revolve with the wheel, and means for preventing rotation of the other part of the pump.

6. The combination with a vehicle wheel having a hub cap of angular form thereon, a pump having pistons, and a shaft for actuating the same, a socket fixed to the pump and adapted to fit upon the hub cap to form a driving connection with the wheel, and a vertical rod fixed at one end and having a sliding engagement with the pump shaft to prevent rotation thereof.

In testimony whereof I have hereunto set my hand in presence of two subscribing witnesses.

WILLARD S. JOBES.

Witnesses:
 JESSE B. WOOD,
 JOSEPH A. GRAHAM.